United States Patent
Wanner et al.

[19]

[11] Patent Number: 6,131,837
[45] Date of Patent: Oct. 17, 2000

[54] SEGMENTED CROP PROCESSOR ROLL FOR FORAGE HARVESTER

[75] Inventors: John E. Wanner, Denver; M. Luke Nolt, Leola, both of Pa.

[73] Assignee: New Holland North America, Inc., New Holland, Pa.

[21] Appl. No.: 09/363,158

[22] Filed: Jul. 28, 1999

[51] Int. Cl.[7] .................................................. B02C 21/02
[52] U.S. Cl. .................................. 241/101.742; 241/235; 241/294
[58] Field of Search .......................... 241/101.742, 227, 241/235, 293, 294, 295

[56] References Cited

U.S. PATENT DOCUMENTS

| | | | |
|---|---|---|---|
| 3,261,741 | 7/1966 | Bidwell | 241/235 |
| 4,345,417 | 8/1982 | deBuhr et al. | 56/143 |
| 4,426,044 | 1/1984 | Martenas | 241/101.2 |
| 4,457,058 | 7/1984 | Binder et al. | 241/294 X |
| 4,505,434 | 3/1985 | Martenas et al. | 241/89.3 |
| 4,678,129 | 7/1987 | Dallinger | 241/101.7 |
| 4,718,612 | 1/1988 | Zweegers | 241/55 |
| 5,103,622 | 4/1992 | Hall et al. | 56/12.1 |
| 5,527,218 | 6/1996 | Van den Bossche et al. | 460/20 |
| 5,822,962 | 10/1998 | Wagstaff et al. | 56/16.4 |

FOREIGN PATENT DOCUMENTS

| | | |
|---|---|---|
| 0664077 | 7/1995 | European Pat. Off. . |
| 3337381 | 10/1983 | Germany . |

*Primary Examiner*—John M. Husar
*Attorney, Agent, or Firm*—Frank A. Seemar; Larry W. Miller

[57] ABSTRACT

A pull type forage harvester including a header, a cylindrical cutter head having rotating knives operatively associated with a shearbar, feed rolls for receiving crop material from the header and conveying it to the cutterhead, and a blower remotely located on the forage harvester relative to the cutterhead. The blower includes a spout for expelling cut crop material to a collecting receptacle. A transverse conveyor consisting of an auger mounted in a trough receives chopped crop material from the cutterhead and conveys it to the blower. Mounted adjacent the cutterhead is a crop processor for crushing chopped crop material received from the cutterhead. The processor comprises a pair of crushing rolls aligned with the is cutterhead axis and above the transverse conveyor. Each roll includes a shaft on which are mounted a plurality of cylindrical segments having similar outer crop engaging surfaces.

6 Claims, 6 Drawing Sheets

SEGMENTED CROP PROCESSOR ROLL FOR FORAGE HARVESTER

FIELD OF THE INVENTION

The present invention relates generally to a crop processor for a forage harvesters and more particularly to a crop processor for a forage harvester in which the crop processor includes a pair of cylindrical processing rolls mounted in the path of the chopped crop material.

BACKGROUND OF THE INVENTION

A typical forage harvester operates in a field to chop windrowed or standing crop material and includes either a self propelled or pull-type base unit with a header attached thereto for cutting or picking up crop material and feeding it rearwardly. The base unit includes a forward generally rectangular inlet opening for receiving crop material from the attachment, a feeding assembly spanning the width of the inlet opening for conveying material into the base unit, a rotating cutterhead for receiving crop material from the feeding assembly and chopping it into appropriate particle sizes. Some units employ a blower for transferring the chopped material up a spout that directs it to a vehicle for transporting it from the field to a silo or other storage apparatus, while others utilize the throwing action of the cutterhead to convey the chopped material up a spout.

One commonly known arrangement of pull-type forage harvester apparatus utilizes a transverse auger for conveying chopped material from the cutterhead to a blower. Exemplary structure of this nature is illustrated by the disclosure at FIG. 1 of U.S. Pat. No. 4,426,043, issued Jan. 17, 1984 in the name of Wayne B. Martenas. Another example of a pull-type forage harvester employing a transverse auger for conveying crop material from the cutterhead to a blower is disclosed in U.S. Pat. No. 4,505,434, issued Mar. 19, 1985 in the name of Wayne B. Martenas, et al.

Insofar as self propelled units are concerned, it is not uncommon to convey chopped material along a direct path between the cutterhead and an inlet to the blower, i.e., no intermediate conveying means are employed. U.S. Pat. No. 5,103,622, issued Apr. 12, 1992 in the name of Larry D. Hall, et al, shows a forage harvester that is representative of prior art self propelled harvesting units without intermediate conveying means.

Regardless of whether a pull-type or self propelled unit is being considered, it is necessary to accommodate a variety of crops, corn being one of the more common types. While chopping corn with a forage harvester, it is not uncommon for less than half the kernels to be cut or cracked by the cylindrical cutterhead. Due to peculiarities of the digestive system of cattle, the full food value of the feed is not utilized in circumstances where the kernels are uncracked or uncut, regardless of the reason. Accordingly, prior art forage harvesters have been provided with crop processor assemblies for further cracking and cutting of the kernels to overcome this problem and enhance the nutritional characteristics of the resulting harvester output.

It is known in crop processor structure, to mount paired crushing rolls in the path between the cutterhead and blower of self propelled forage harvester apparatus. An example of structure of this nature is disclosed in U.S. Pat. No. 5,527,218, issued Jun. 18, 1996 in the name of Bart Van den Bossche, et al. Similar structure is shown in U.S. Pat. No. 4,678,129, issued Jul. 7, 1987 in the name of James F. Dallinger. In both the aforementioned patents, the crop processor structure, located below the cutterhead, feeds processed crop material to a blower having an inlet located below the processor. This general arrangement of cutterhead, processor, and blower inlet is also disclosed in U.S. Pat. No. 4,345,417, issued Aug. 24, 1982 in the name of Harold E. deBuhr, et al. In this patent an auger assembly is disposed rearwardly and below the processor rolls for receiving crushed crop material and conveying it to the blower inlet. In other prior art forage harvesters, processors have been mounted between the cutterhead and the discharge spout, e.g., see German Patent No. DE 33 37 381 A1, issued Apr. 25, 1985 in the name of Claas oGH.

Crop processors are also incorporated in pull-type forage harvesters, an example of which is a unit manufactured and sold by New Holland North America, Inc., assignee of the present application, under the Model Number 900, shown in a brochure published under No. 33090010-89820-VPC. U.S. Pat. No. 5,822,962, issued Oct. 20, 1998 in the name of Robert A. Wagstaff, et al, is a similar showing of a pull-type forage harvester with crop processing capability. Another pull type harvester shown in U.S. Pat. No. 4,718,612, issued Jan. 12, 1988 in the name of Petrus W. Zweegers shows a processor operative between the cutterhead and the discharge spout. This type of unit is sometimes referred to as a cut and throw forage harvester.

Regardless of the overall structure involved, during operation, the flow of crop material in forage harvesters is not uniform and the ensuing flow across the width of a processing roll is uneven, leading to localized excessive wear, resulting in reduced cracking effect of the corn kernels at the worn area. Eventually, a new processing roll or a new pair of rolls must be installed to assure proper processing of the kernels. The roll is a highly tooled costly element. To reduce the cost involved in repairing or replacing the roll, European Patent Application No. 0664077, published Jul. 26, 1995in the name of New Holland Belgium N.V., shows a roll with replaceable end sections, both of which are situated in the portions of the processor in this particular harvester subject to the occurrence of significant wear problems. These two relatively narrow sections are attached in coaxial fashion to the ends of a relatively wide central section, thus avoiding the need for replacing the entire costly roll assembly.

Unique characteristics of the present invention, described below, contribute to a processor roll for a forage harvester with reduced costs involved in repair and replacement due to excessive wear and damage that, among other things, enhances performance, serviceability and durability.

SUMMARY OF THE INVENTION

An important object of the present invention is to provide forage harvester apparatus with a simple and reliable crop processor assembly.

Another object of the present invention is to provide forage harvester apparatus with a crop processor roll that enhances durability.

Still another object of the present invention is to provide forage harvester apparatus with a crop processor roll that improves serviceability.

A further object of the present invention is to provide forage harvester apparatus with a crop processor roll that improves performance.

In pursuance of these and other important objects the present invention contemplates an improved forage harvester having a main frame supported on ground engaging wheels, a header mounted on and extending forwardly from the main frame, a cutting assembly comprising a cylindrical cutterhead including a plurality of knives having cutting edges rotating in a cylindrical path and a shearbar operatively associated with the knives for chopping crop material, feed means for receiving crop material from the header and conveying it to the cutting assembly, a discharge assembly located on the main frame for receiving chopped crop material and an outlet for discharging chopped crop material via a spout to a collecting receptacle, and a crop processor assembly comprising a pair of crushing rolls for crushing chopped crop material received from the cutting assembly and for expelling it along a direct path to the discharge assembly. More particularly, the improvement comprises a processor assembly in which at least one of the pair of crushing rolls comprise a continuous shaft and a plurality of cylindrically shaped segments mounted on the shaft, the segments each having a fluted outer surface.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE INVENTION

Figure 1:
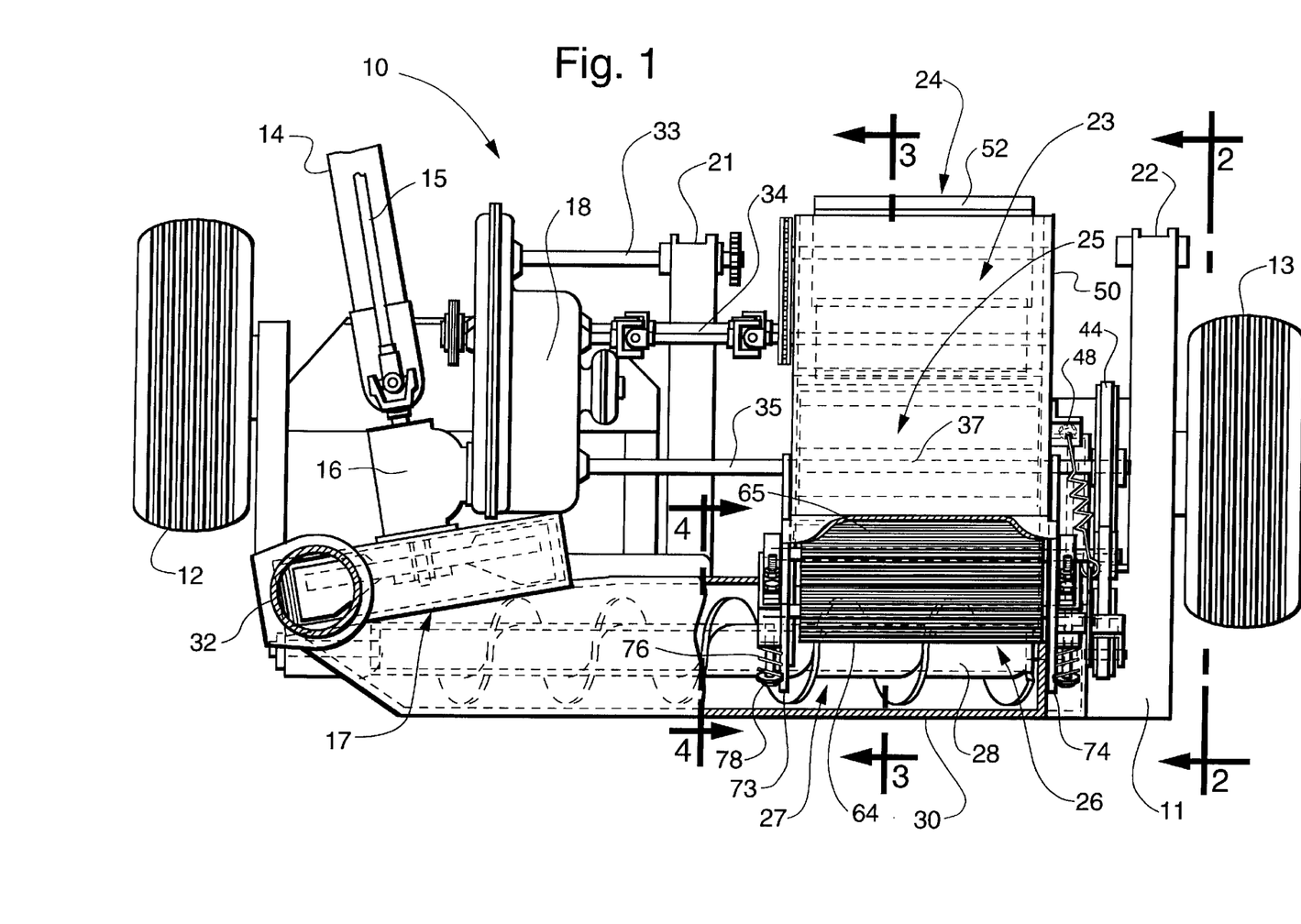
FIG. 1 is a diagrammatical plan view of a pull-type forage harvester with a cutaway portion showing a crop processor assembly in which the present invention is readily embodied.

Referring now to the drawings for a more detailed description of the present invention, FIG. 1 shows diagrammatically a pull-type forage harvester base unit, generally designated by reference numeral 10, comprising a main frame 11 on which ground engaging wheels 12, 13 are mounted for transport via a tongue 14 adapted to be hitched to a tractor in a conventional manner. The tractor provides power via a PTO drive shaft 15 coupled to a main gear box 16 having output shafts for driving blower 17 and secondary gear box 18.

Figure 2:
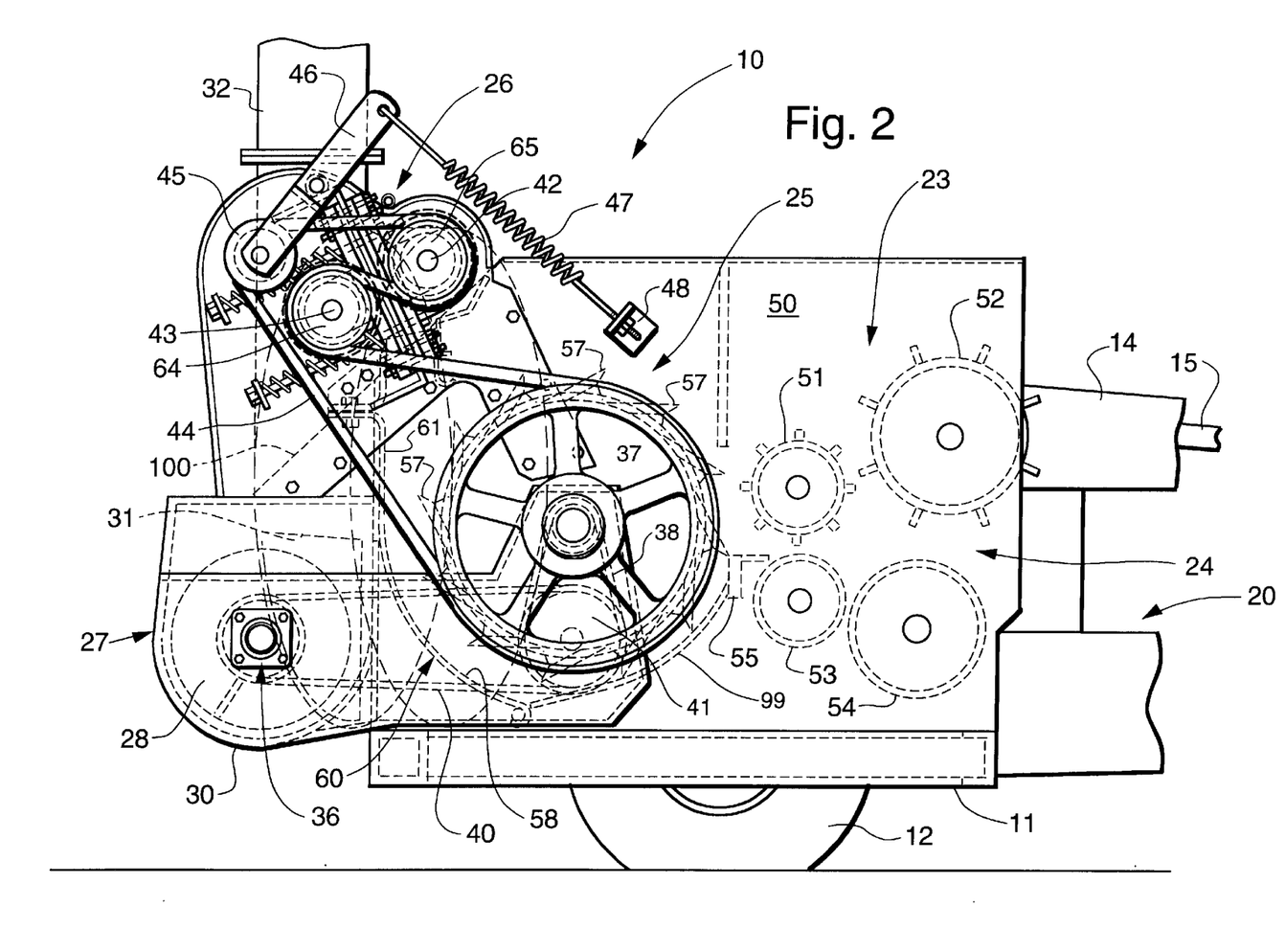
FIG. 2 is an elevational view showing a section taken along line 2—2 of FIG. 1.
Figure 3:
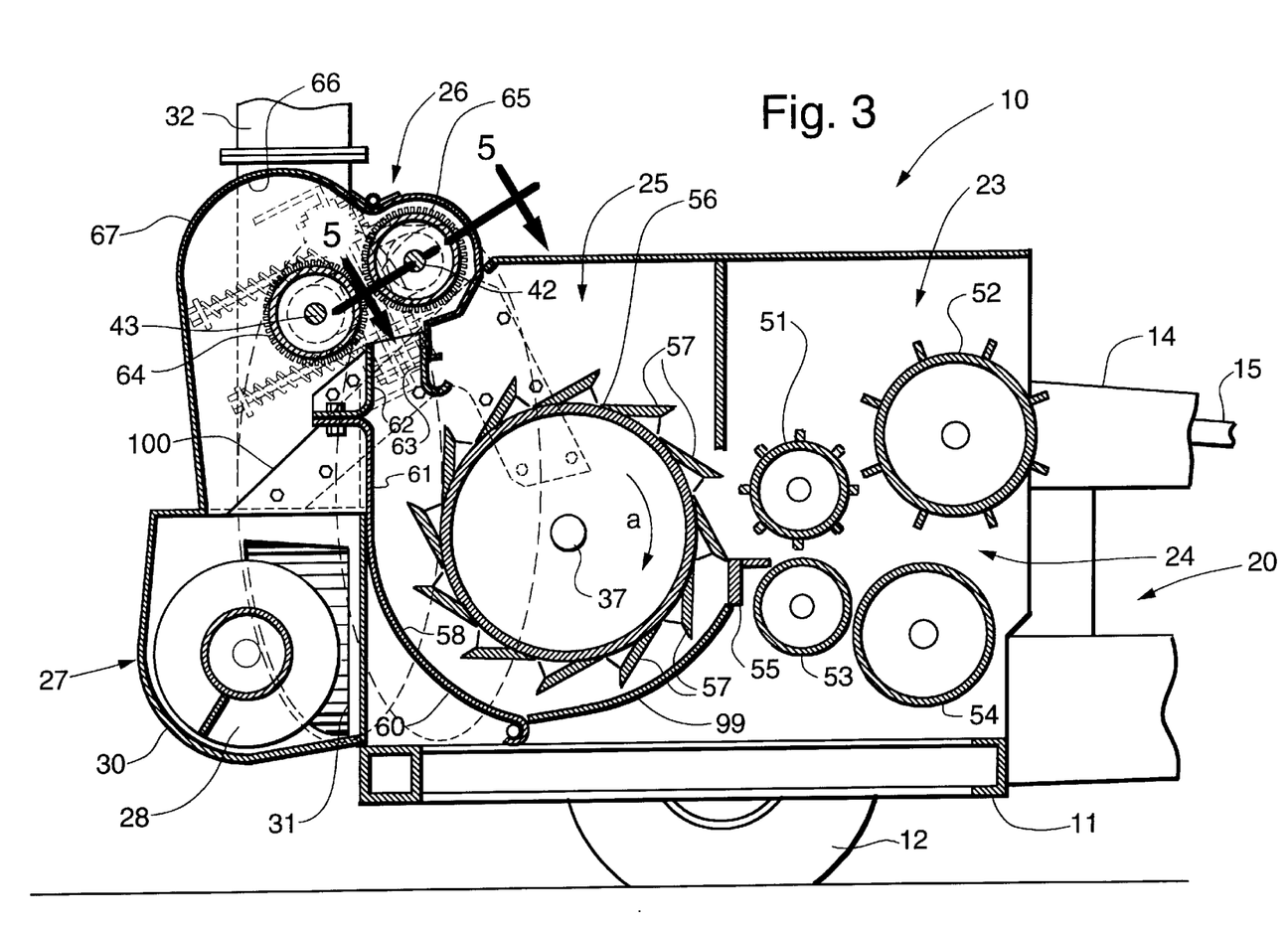
FIG. 3 is an elevational view showing a section taken along line 3—3 of FIG. 1.

A header, illustrated by reference numeral 20 in FIGS. 2 and 3, mounted to the main frame 11 at 21, 22, feeds crop material in a conventional manner to a feed roll assembly 23 through a forwardly located inlet 24. Material is fed via feed roll assembly 23 to a cutting assembly 25, which chops the crop material and throws it into a crop processor assembly 26. Chopped and processed crop material is collected in a transverse conveyor assembly 27, comprising an auger 28 rotatably mounted in trough 30, and conveyed to an inlet 31 (FIG. 2) in blower 17, where it is discharged via a spout 32 to a collecting receptacle, such as a wagon being towed behind the forage harvester. Secondary gear box 18 includes output shafts 33, 34, 35 for driving the header, the feedroll assembly and the cutterhead assembly, respectively.

Auger 28, journaled for rotation in bearing assembly 36, is rotated via a drive taken off cutterhead shaft 37, which drive includes belts 38 and 40 and intermediate sheave 41. Sheave 41, driven with cutterhead shaft 37, is coupled to crushing roll shafts 42, 43, via belt 44, held in tension by idler roll 45, pivotally mounted on arm 46, which is urged in a clockwise direction by tensioning spring 47 anchored to bracket 48 secured to sidewall 50.

For further description of the general structure and function of a forage harvester and particularly a prior art pull-type forage harvester with a crop processor assembly, reference is made to above mentioned U.S. Pat. No. 5,822,962, which is hereby incorporated by reference. The apparatus in this patent shows that it is known to feed chopped crop material from a cutterhead to the transverse auger via a pair of crushing rolls for cracking the kernels of the corn being processed. The similarity of the forage harvester of the '962 patent and the forage harvester structure in which the present invention is embodied, should be noted, in that this invention is an improvement to the pull type harvester of the '962 patent, issued to a common assignee. To this end, the present invention is adaptable to any forage harvester employing a corn processor, the unit shown being that unit on which reduction to practice took place.

More specifically, the harvester shown comprises a base unit 10 that includes a pair of aggressive upper feed rolls 51, 52, cooperating with opposing lower feed rolls 53, 54 to feed a mat of crop material with a generally rectangular cross section across shearbar 55. A cylindrical cutterhead 56 comprising a plurality of transverse knives 57 rotates in a clockwise direction to bring the cutting edges of knives 57 in shearing relationship with shearbar 55, which presents a stationary cutting edge. As mentioned above, these feed roll and cutting assemblies are conventional. What is not conventional and is at the heart of applicants' invention is the structure of the rolls of crop processing assembly 26, which structure is set forth in detail below. Assembly 26 is mounted to receive crop material conveyed along an arcuate inner surface 58 of a diversion baffle 60, interposed between the cutterhead and the auger. Adjacent arcuate inner surface 58 is a contiguous flat surface portion 61 which guides chopped material upwardly through a throat area defined by walls 62, 63 to counter rotating crushing rolls 64, 65. The crushed material is discharged upwardly and rearwardly against arcuate portion 66 of guide plate 67 and then downwardly to the right end of auger assembly 27, which conveys it to blower 17 via inlet 31.

Figure 4:
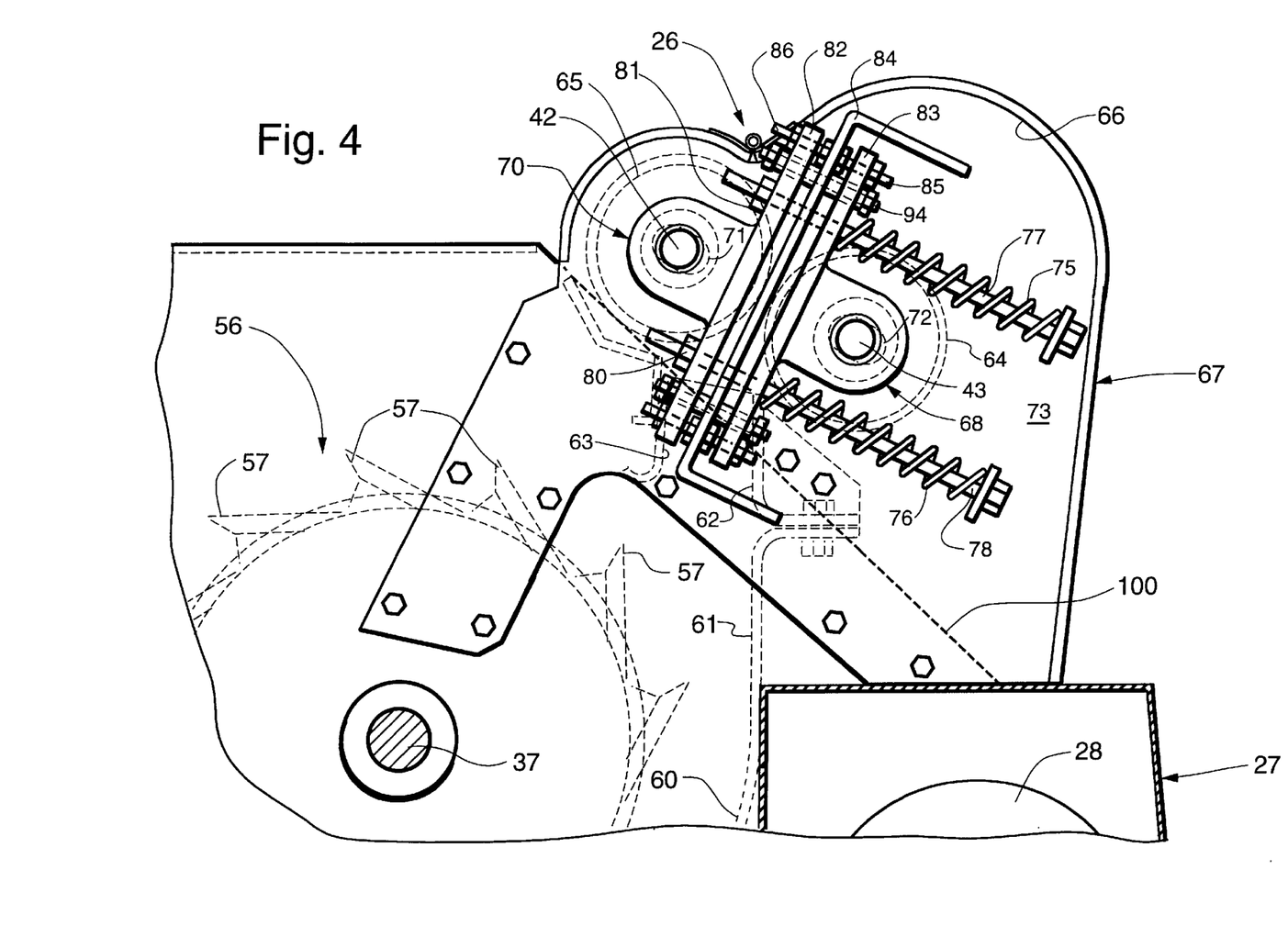
FIG. 4 is a partial elevational view showing a section taken along line 4—4 of FIG. 1.

Now turning to FIG. 4, crushing rolls 64, 65 of crop processor assembly 26 are mounted in two pairs of pillow block bearing assemblies. For the purpose of this description, reference is only made to upper and lower pillow block bearing assemblies 68, 70, shown mounted on the left side of the machine. Identical assemblies are mounted on the right side. Slots 71, 72 in sidewalls 73, 74 of crop processor assembly 26 accommodate shafts 42, 43 to permit the space between the crushing rolls to vary. Left and right pairs of compression springs 75, 76 (FIG. 4) associated with the ends of the rolls are mounted on bolts 77, 78 and secured in place by nuts 80, 81, to urge flanges 82, 83 of bearing assemblies 70, 68 toward a mounting bracket 84 which is affixed to side wall 73.

Figure 5:
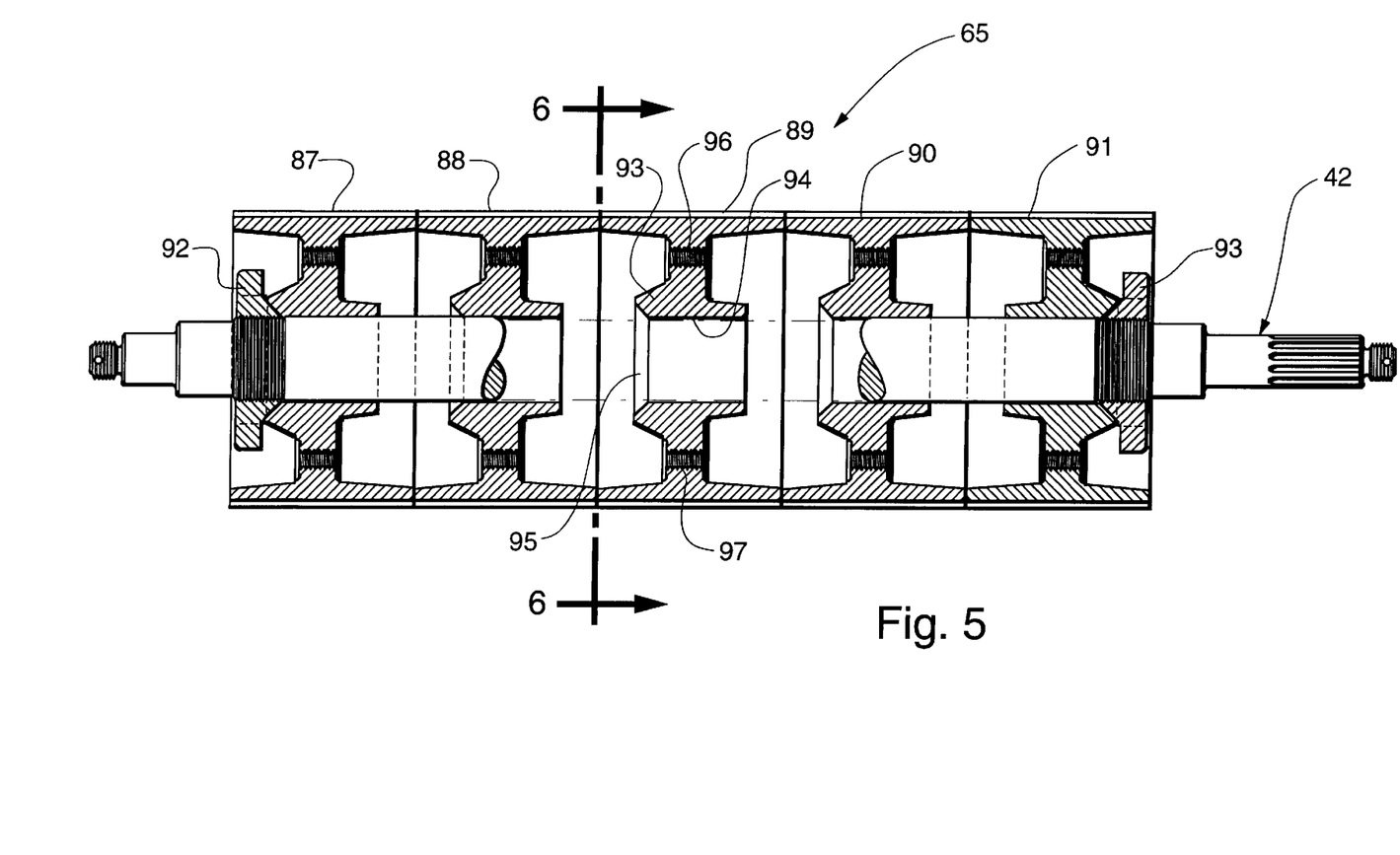
FIG. 5 is a sectional view taken along line 7—7 of FIG. 3, showing a section through one of the crushing rolls.
Figure 6:
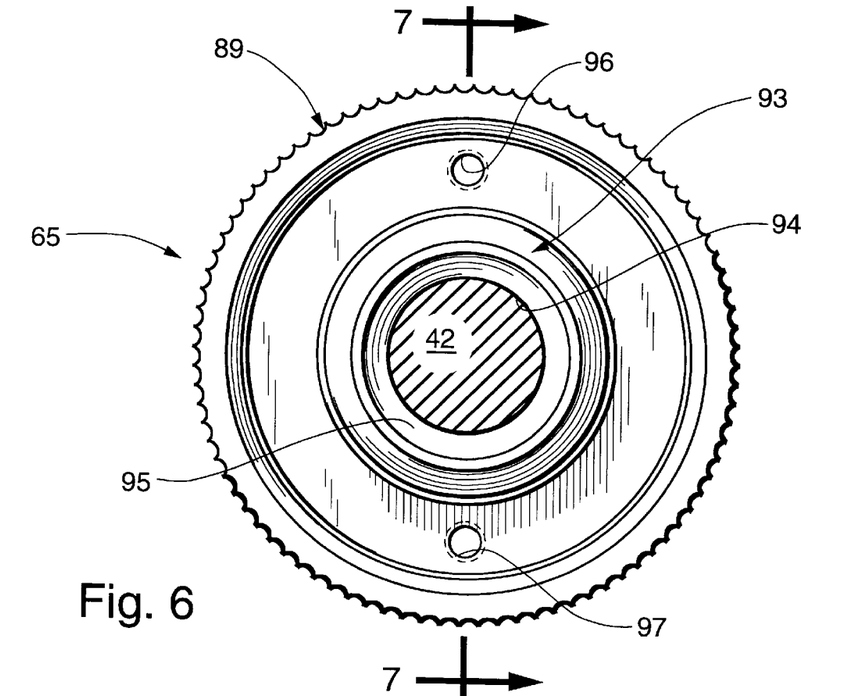
FIG. 6 is a cross sectional view taken along line 6—6 of FIG. 5.
Figure 7:
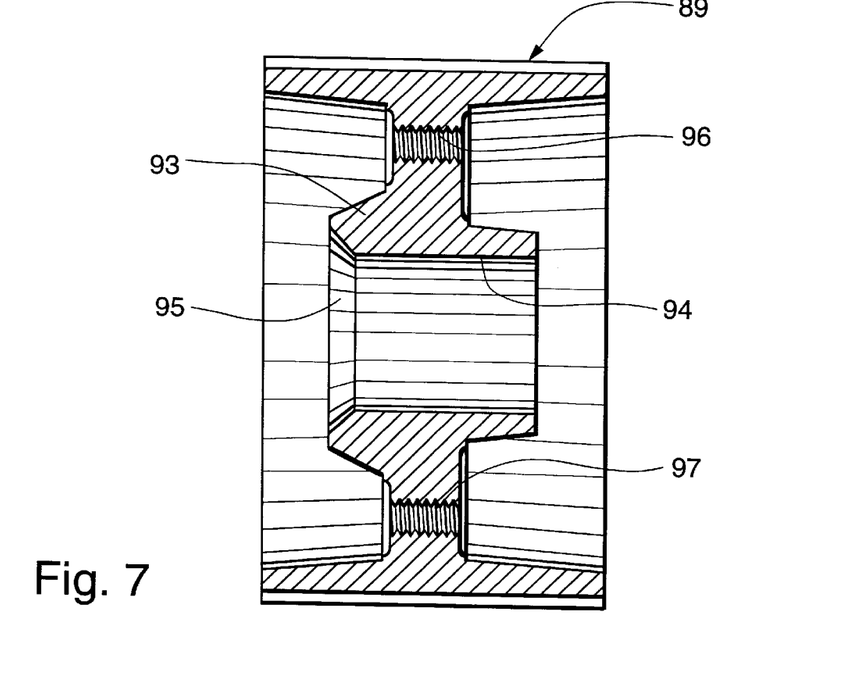
FIG. 7 is a cross sectional view taken along line 7—7 of FIG. 6.

In FIGS. 5–7, the structure of roll 65, which will now be described in detail, is shown. Roll 64 is identical to roll 65.

FIG. 5 shows roll 65, comprising shaft 42 on which a plurality of fluted segments 87, 88, 89, 90 and 91 are mounted. In FIG. 6 shaft 42 is cut away to show a side elevation of segment 89, a section through which is shown in FIG. 7. Although all segments are shown as identical in this embodiment, they could have varying lengths, as will become apparent from the following description of the invention. For example, segments 87, 88, 90 and 91 could be interchangeable while the center segment 89 could vary in length to accommodate processor assemblies that adapt to cutterheads having different widths.

Shaft 42 is threaded to receive holding nuts 92 and 93. Segment 89, as in the case of each segment, includes an integral hub section 93 with a machined bore 94 to receive shaft 42. At one end of bore 94 a beveled surface 95 is provided to receive a like beveled surface on holding nuts 92 and 93. In the preferred embodiment, as shown in FIG. 5, the hub on segment 87 is installed on shaft 42 with surface 95 facing the left to receive nut 92 and the hub on segment 91 is installed on shaft 42 facing the opposite direction to receives nut 93. By tightening down nuts 92 and 93 along the threads on shaft 42, the segments are secured together with adjacent outer fluted surfaces thereof engaging in operative fashion to form roll 65. There is no need for the flutes to be in alignment in that rolls 64 and 65 are spaced apart and never come in contact either during processing nor during their nonoperative state. It should be noted that because the hub portions of the segments are recessed, i.e., shorter axial length than the fluted outer surface, the outer peripheral flange portions of the segments are held snugly in place under conditions where the nuts are securely tightened.

Another convenient feature of the segments is provided by diametrically opposed threaded holes 96 and 97, which accommodate temporary bolts with extended shanks for utilization during removal of the segments from shaft 42. Without such temporary bolts removal and replacement of the segments along shaft 42 is difficult if not impossible, due to close tolerances between shaft 42 and bore 94, and due to the lack of any convenient area on which the segments may be grasped by the operator, bearing in mind that each segment is cast iron and can be extremely heavy.

In operation feed rolls 51, 52, 53, 54 feed uncut crop material along a path to the top of shearbar 35 where it is engaged by knives 57 of cutterhead 56 and cut into small particles that are guided along a wall 99 and diversion baffle 60. Segmented crushing rolls 64, 65 receive the chopped crop material in the nip between their fluted outer surfaces for cracking uncut kernels. Rolls 64 and 65 are spring loaded to a factory set gap of 3/32 inches between the fluted outer surfaces, but closer adjustments are possible if necessary. In the embodiment, it has been determined that a maximum gap of 5/8 inches under spring pressure is necessary to accommodate large clumps of crop material or to operate in heavier crop conditions in general.

Roll 65 rotates at 2650 RPM while roll 64 rotates at 2250 RPM. This speed differential enhances the processing action of the sharp edges of the flutes. After passing through the rolls the chopped and crushed material is expelled against the arcuate potion of guide plate 67 to auger 28. Diversion baffle 60 is readily removable, in a manner similar to a recutter screen, in the event there is no need for the processing rolls. Further, the entire crop processing assembly is designed to be readily removable by deconnecting side walls 73, 74, lifting the assembly away, and replacing it with a flat access door secured to flat edges 100, e.g., see FIG. 4, resulting in an auger assembly enclosed in a well known manner.

Thus, as the cutterhead is rotated in direction a (see FIG. 3) the cutting edges of knives 57 generate a cylindrical path, which brings the knives in contact with crop material being fed across fixed shear bar 55 in a well known manner. The chopped material continues along wall 99 whereupon it is either delivered to the processing rolls and then to the cross auger of the present invention or, alternatively, the machine is modified and it is delivered directly to the auger if processing is not necessary.

Of the many implicit and explicit advantages of the present invention one of the most important is the provision of a segmented processing roll for a forage harvester having individually separable elements that are conveniently and simply replaceable or interchangeable, giving rise to significant time and cost savings during routine maintenance or field service, whatever the case may be.

While preferred structure in which the principles of the present invention is shown and described above, it is to be understood that the invention is not limited to such preferred structure, but that, in fact, widely different means of varying scope and configuration may be employed in the practice of the invention. Further, it should be particularly noted that the present invention is equally adaptable to a self propelled forage harvester as it is to pull type forage harvester.

Having thus described the invention, what is claimed is:

1. In a forage harvester comprising
   a main frame supported on ground engaging wheels,
   a header mounted on and extending forwardly from said main frame,
   a cutting assembly comprising a cylindrical cutterhead including a plurality of knives having cutting edges rotating in a cylindrical path, and a shearbar operatively associated with said knives for chopping crop material,
   feed means for receiving crop material from said header and conveying it to said cutting assembly,
   a blower located on said main frame, said blower including an inlet for receiving crop material and an outlet for discharging chopped crop material via a spout to a collecting receptacle, and
   a crop processor assembly comprising a pair of crushing rolls for crushing chopped crop material received from said cutting assembly and expelling it along a path to said blower inlet, the improvement comprising
      at least one of said pair of crushing rolls comprise a continuous shaft, and
      a plurality of identical cylindrically shaped segments mounted on said shaft, all of said plurality of identical cylindrically shaped segments are interchangeable,
      said segments each having a fluted outer surface, the fluted outer surface of each of said plurality of said identical cylindrically shaped segments being contiguous with the fluted outer surface of the adjacent segment.

2. A forage harvester as set forth in claim 1 wherein each of said cylindrically shaped segments comprise an integral mounting hub having a centrally located bore for operatively receiving said shaft, said hub coaxial with said fluted outer surface and said shaft, and wherein said fluted surface of each of said cylindrically shaped segments extends in an axial direction along said shaft a distance greater than the distance said integral mounting hub extends along said shaft.

3. A forage harvester as set forth in claim 2 wherein said improvement further comprises
   holding means for removeably securing said segments along said shaft, said holding means comprise at least one nut threaded on said shaft.

4. A forage harvester comprising in combination a main frame supported on ground engaging wheels, a header mounted on and extending forwardly from said main frame, a cutting assembly comprising a cylindrical cutterhead including a plurality of knives having cutting edges rotating in a cylindrical path, and a shearbar operatively associated with said knives for chopping crop material, feed means for receiving crop material from said header and conveying it to said cutting assembly, a discharge assembly located on said main frame, said discharge assembly including an inlet for receiving crop material and an outlet for discharging chopped crop material via a spout to a collecting receptacle, a crop processor assembly comprising a pair of crushing rolls for crushing chopped crop material received from said cutting assembly and expelling it along a path to said inlet, at least one of said pair of crushing rolls comprise a continuous shaft, and a plurality of cylindrically shaped segments mounted on said shaft, at least two of said plurality of cylindrically shaped segments are interchangeable, said segments each having a fluted outer surface, the fluted outer surface of each of said plurality of said cylindrically shaped segments being contiguous with the fluted outer surface of the adjacent segment, each of said cylindrically shaped segments comprise an integral mounting hub having a centrally located bore for operatively receiving said shaft, said hub coaxial with said fluted surface and said shaft, and wherein said fluted surface of each of said cylindrically shaped segments extends in an axial direction along said shaft a distance greater than the distance said integral mounting hub extends along said shaft.

5. A forage harvester as set forth in claim 4 wherein said improvement further comprises holding means for removeably securing said segments along said shaft, said holding means comprise at least one nut threaded on said shaft.

6. A forage harvester as set forth in claim 5 wherein all of said plurality of cylindrically shaped segments are interchangeable.

\* \* \* \* \*